April 19, 1932.  W. S. GRAHAM  1,854,834
TRACTOR IMPLEMENT ATTACHMENT
Filed Sept. 20, 1930
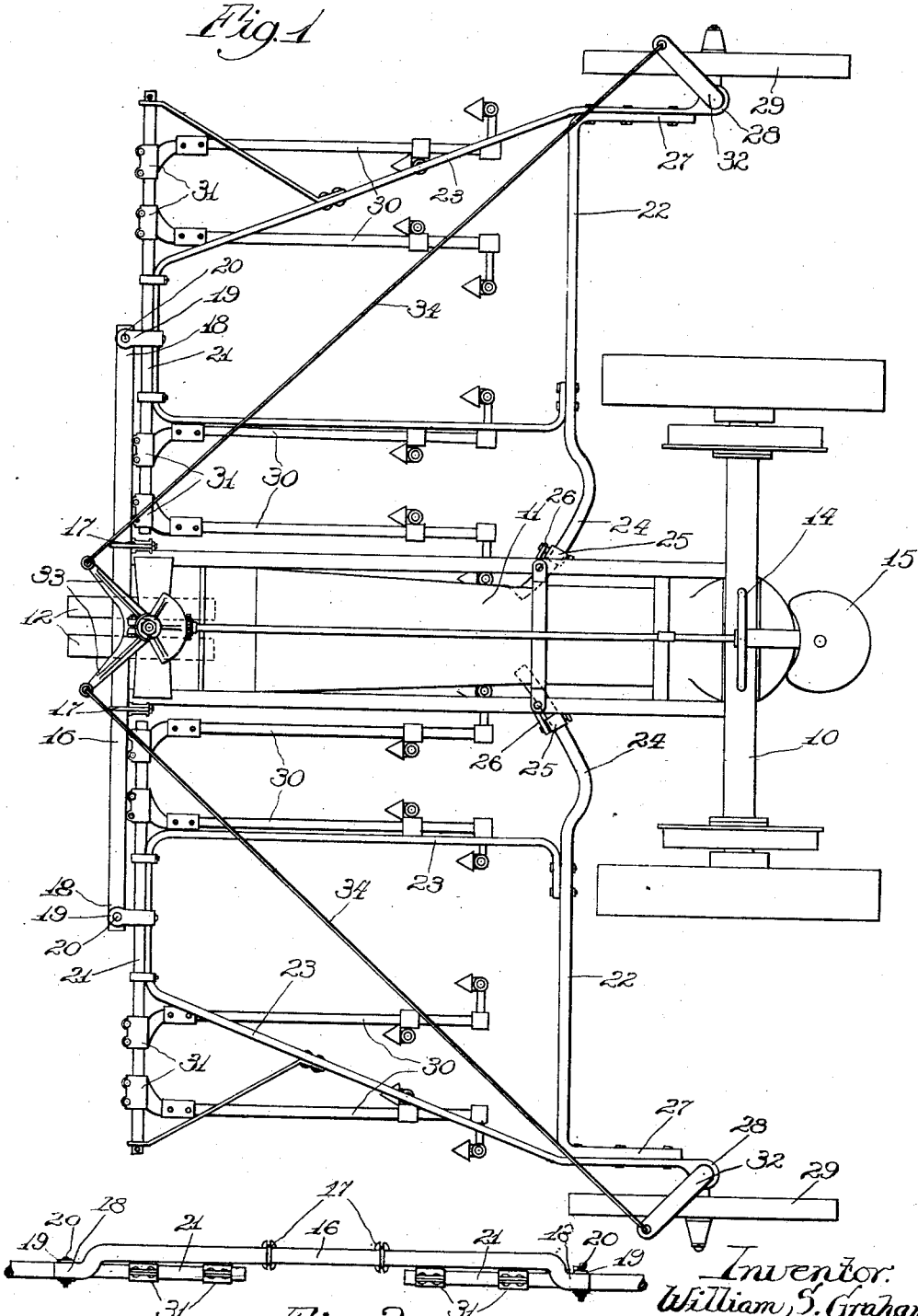

Patented Apr. 19, 1932

1,854,834

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

TRACTOR IMPLEMENT ATTACHMENT

Application filed September 20, 1930. Serial No. 483,192.

The present invention relates to tractor propelled implements and in particular to row-crop attachments intended for operation on two or more plant rows at once.

The main objects of the invention are to facilitate row following movements of the implements by providing a form of supporting structure for row-crop implements at each side of the tractor which will permit of lateral swinging movement of the supporting structure and implements about a forward point of pivoted connection to the tractor, and to effect such swinging movement in a novel manner through control means on the tractor.

A preferred embodiment of the invention is hereinafter described in detail and illustrated in the accompanying drawings, where:

Figure 1 is a plan view of a tractor and four-row cultivator attachment comprising the novel structure; and, Figure 2 is a detail view of the attachment seen from the front.

In the present instance, the invention is shown in connection with a tractor of the row-crop type comprising a transversely extended rear axle structure 10 and traction wheels spanning the space of two plant rows of such crops as corn or cotton, and a relatively narrow forwardly extending central body portion 11 supported at the front on a steering truck 12. The truck includes a vertical standard 13 journaled in the tractor body and connected by suitable gears to the steering shaft extending rearwardly above the tractor body to the steering wheel 14 adjacent the operator's station 15 on the tractor. The tractor structure briefly described is well known and is described in greater detail in the patent to Benjamin et al. 1,667,371, April 24, 1928.

In the construction herein disclosed, the tractor has a transverse draft member 16 extending across the front end of the tractor and fixedly secured in position by bolting it to brackets 17 at each side of the tractor body. This provides outwardly extending draft arms at each side of the tractor, which preferably extend to, or beyond, the tread lines of the rear traction wheels. At each end, the draft member 16 is bent downwardly to provide a parallel offset end portion 18, which carries a U-shaped bracket or yoke 19, the arms of which are connected to the draft member on a vertical pivot 20. Each yoke 18 receives a secondary draft member or bar 21, the middle of which is secured within the bight portion of the yoke. Each bar 21 is preferably of such length as to extend over the space required for two plant rows, located at each side of the tread line of a traction wheel. Each bar 21 forms the front member of an implement carrying frame comprising also a rear transverse frame bar 22 and longitudinal connecting bars 23, all suitably connected and braced to form a rigid structure. The inner end of each rear frame bar 21 is formed to provide a forwardly curved portion 24 which extends on an arc having the pivot 20 of that frame as its center. The curved portion 24 extends beneath the tractor body and is movably held between rollers 25 mounted in a supporting bracket 26 secured to and positioned just below a side member of the tractor body.

At the outer end, each rear bar 22 has a rearward extension 27, to which one of the longitudinal bars may be riveted, as shown by Figure 1, and the end of the longitudinal bar is provided with a vertical bearing sleeve 28 in which there is journaled a standard having an axle or pintle at its lower end, on which a supporting wheel 29 is journaled. The supporting wheels 29 are thus located rearwardly of the implement supporting frames and approximately in alignment with the traction wheels of the tractor.

The implement supporting frames may be equipped with any of the tools used in connection with the cultivation or harvesting of growing row-crops where following deviations in the rows is necessary, and in this instance each secondary draft bar 21 is shown as carrying two pairs of cultivator beams 30 arranged in straddle-row relation and trailing from sleeves 31 pivoted on the bar 21. Any suitable means (not shown) for lifting and lowering the beams may be mounted on each implement frame in the usual manner.

In order to effect the guiding movements of the implement carrying frames, the standard of each wheel 29 is provided with a horizontal angular arm or crank 32 extending forwardly and outwardly at an angle of substantially forty-five degrees to the line of travel of the tractor. The standard 13 of the steering truck has secured to it two similar crank arms 33, each one of which is parallel to the corresponding crank arm 32 on the implement frame at one side, and a connecting rod 34 connects each pair of crank arms 32—33. Accordingly, angular movement of the steering truck, as in steering, will be communicated to the implement wheels 29 and angle them in the same direction.

In operation the machine will move over plant rows with the traction wheels, truck wheels, and implement frame wheels traveling in the spaces between the rows. As four row cultivation, etc. is a concomitant of four row planting, any deviations will be the same in all four rows. As the crop working tools are located near the rear of the implement frames, it is necessary that these frames be swung laterally in the direction of steering movement as the front end of the tractor swings to right or left, to thereby shift the tools and maintain the implement frames in substantially parallel relation to the plant rows as the tractor is steered to follow deviations therein. With the structure disclosed, steering movement given the truck will be imparted to the wheels 29, thereby causing the frames to swing on the pivots 20 and in effect giving the rear portions of the implement frames the same degree of lateral movement given the front end of the tractor by the action of the steering truck. Row following, or so-called dodging action, is accordingly obtained for rearwardly positioned tools with a minimum of movement of the steering truck, a result not possible with side connected implement frames in fixed relation to the tractor as heretofore constructed. Also, short turn of the tractor at the head lands will not be interfered with, as the implement wheels will then travel in opposite directions about the center on which the tractor is turning without materially affecting the positions of the implement frames.

What is claimed is:

1. The combination with a tractor having front dirigible wheels and means for steering said wheels, of a laterally extending draft member on the forward end thereof, a rearwardly extending implement frame forwardly pivotally connected to said member for lateral swinging movement, a dirigible supporting wheel on the rear of the frame, and a steering connection between said wheel and the tractor steering means.

2. The combination with a tractor having front dirigible wheels and means for steering said wheels, of a laterally extending draft member on the forward end thereof, a rearwardly extending implement frame forwardly pivotally connected to said member for lateral swinging movement, a cross-member at the rear side of the implement frame having its inner end slidably supported on the tractor, a dirigible wheel supporting the outer end of said cross-member, and a steering connection between said wheel and the tractor steering means.

3. The combination with a tractor having front dirigible wheels and means for steering the wheels, of a transverse draft member secured to the front end of the tractor and projecting from each side thereof, implement frames comprising transverse forward bars pivoted centrally to each end of said draft member on vertical pivots and rear transverse bars having arcuate portions at their inner ends which are slidably supported on the tractor, a dirigible wheel supporting the outer end of each rear transverse bar, row crop implements connected in spaced relation to the forward transverse bar, and steering connections between the tractor steering means and each of said dirigible wheels.

In testimony whereof I affix my signature.

WILLIAM S. GRAHAM.